United States Patent [19]

Humbel et al.

[11] Patent Number: 4,979,819

[45] Date of Patent: Dec. 25, 1990

[54] FOUCAULT KNIFE-EDGE TEST FOR QUANTITATIVELY DETERMINING A WAVEFRONT ABERRATION OVER THE ENTIRE SURFACE OF AN OPTICAL IMAGING DEVICE

[75] Inventors: William D. Humbel, Rochester; Donald E. Vandenberg, Brockport; Thomas W. Dey, Springwater; John G. Pitek, Rochester, all of N.Y.

[73] Assignee: Eastman Kodak Company, Rochester, N.Y.

[21] Appl. No.: 500,640

[22] Filed: Mar. 28, 1990

[51] Int. Cl.$^5$ .............................................. G01B 9/00
[52] U.S. Cl. ................................................... 356/124
[58] Field of Search ............... 356/124, 125, 126, 127, 356/129

[56] References Cited

U.S. PATENT DOCUMENTS 4,272,190 6/1981 Shapiro .............................. 356/124

Primary Examiner—F. L. Evans
Attorney, Agent, or Firm—Stephen C. Kaufman

[57] ABSTRACT

The historical Foucault knife-edge test enables one to qualitatively ascertain an optical imaging device's characteristics, for example, whether or not it is a source of optical aberrations. The novel method of the present invention, in sharp contrast, complements the historical Foucault knife-edge test, by expanding the test so as to develop a quantitative interpretation of the imaging device's characteristics. In particular, the novel method is suitable for determining a wavefront aberration over an entire surface of the imaging device.

3 Claims, 8 Drawing Sheets

SAMPLE SPACE — MAPPING → CONJUGATE SAMPLE SPACE

DISCRETE POINTS CORRESPONDING
TO DISCRETE PREDETERMINED AREAS
IN THE CONJUGATE SAMPLE SPACE

FOUCAULT KNIFE-EDGE TEST FOR QUANTITATIVELY DETERMINING A WAVEFRONT ABERRATION OVER THE ENTIRE SURFACE OF AN OPTICAL IMAGING DEVICE

CROSS REFERENCE TO RELATED APPLICATIONS

This application is related to U.S. application Ser. No. 07/464,278 filed Jan. 12, 1990, by Vandenberg et al; to U.S. application Ser. No. 07/464,042 filed Jan. 12, 1990 by Pitek et al; to U.S. application Ser. No. 07/485,413 filed Feb. 27, 1990 by Dey et al; to U.S. application Ser. No. 07/485,182 filed Feb. 27, 1990 by Humbel et al; and to U.S. application Ser. No. 07/496,732 filed Mar. 21, 1990, by Vandenberg et al. The entire disclosures of each of these applications are incorporated by reference herein. Each of these applications is copending and commonly assigned.

FIELD OF THE INVENTION

This invention relates to a method for testing an imaging device.

INTRODUCTION TO THE INVENTION

As disclosed in the above referenced applications, a Foucault knife-edge test has been traditionally understood to be perhaps the classic optical test for an objective, or imaging device.

Attention is directed to FIG. 1, which shows a typical optical assembly 10 for demonstrating the basic principles of the Foucault knife-edge test. The assembly 10 includes a conventional imaging device, i.e., a lens 12, the lens 12 comprising a pair of optical surfaces 14 and 16; a radiation source 18; a collector lens 20; and a conventional photodetector 22 comprising the human eye. The components of the assembly 10 are aligned to a reference axis 24.

For this optical assembly 10, one may employ the knife-edge test for qualitatively detecting (at the eye/photodetector 22) the presence of transverse aberrations that may have been introduced into the assembly 10 by the lens optical surfaces 14, 16. Accordingly, a knife-edge 26 may be gradually introduced into the assembly 10 (shown by way of the FIG. 1 staggered arrows), so that the knife-edge 26 sequentially cuts and blocks the image of the radiation source 18 at a plane of convergence 28. This action, in turn, removes source rays from their expected trajectories, so that a variable intensity pattern may be registered by the eye. Finally, a comparison of this intensity pattern with a theoretical intensity pattern for an ideal optical surface, can become a qualitative measure of the presence of transverse aberrations introduced by the optical surfaces 14, 16.

SUMMARY OF THE INVENTION

So far, we have stressed that the Foucault knife-edge test can provide a qualitative measure of the presence of transverse aberrations that may have been introduced by the imaging device 12. Attention is now directed to FIGS. 2 and 3, which figures help explain what we mean by a qualitative test.

In particular, FIGS. 2A, B, C, D show, in sequence, what the eye can qualitatively perceive when an ideal imaging device is subjected to the Foucault knife-edge test, and the knife-edge is sequentially advanced through four successive knife-edge positions viz:

FIG. 2A: knife-edge position 1=total non-occlusion of the radiation (no shadow);

FIG. 2B: knife-edge position 2=partial occlusion of the radiation (light, uniform shadowing);

FIG. 2C: knife-edge position 3=further occlusion of the radiation (darker, uniform shadowing);

FIG. 2D: knife-edge position 4=total occlusion of the radiation (total shadow).

In summary, FIGS. 2A–D show that, for the ideal imaging device, the eye can qualitatively perceive an ever increasing and uniform shadow pattern. We can say, moreover, that the FIG. 1 collector lens 20 can provide images of the imaging device 12 at a photodetector plane, that is, at the eye, which images are the FIGS. 2A–D shadow patterns.

Now we turn our attention to FIGS. 3A–D, which sequentially show what the eye can qualitatively perceive when a non-ideal imaging device is substituted for the FIG. 2 ideal imaging device, and is subjected to the Foucault knife-edge test. In particular, as the knife-edge is sequentially advanced through four successive knife-edge positions, the eye can sequentially and qualitatively perceive:

FIG. 3A: knife-edge position 1=total non-occlusion of the radiation (no shadow);

FIG. 3B: knife-edge position 2=partial occlusion of the radiation (light, non-uniform shadowing);

FIG. 3C: knife-edge position 3=further occlusion of the radiation (darker, more obscure shadowing);

FIG. 3D: knife-edge position 4=total occlusion of the radiation (total shadow).

In summary, FIGS. 3A–D show that, for the non-ideal imaging device, the eye can qualitatively perceive an ever increasing shadow pattern: the FIGS. 3A–D shadow patterns, in contrast to that of FIGS. 2A–D, are marked by salients consisting of various dark zones with different radii of curvature, and different centers of curvature.

Comparing, therefore, the shadow patterns provided in FIGS. 3A–D, versus those provided in FIGS. 2A–D, one skilled in the art may be enabled to say, based upon his subjective experience, that the FIG. 3 non-ideal imaging device has introduced some transverse aberrations into the assembly 10. A skilled optician may indeed be able to say more, for example, that the FIG. 3 shadow pattern suggests that the aberration is trefoil, or quadrafoil, or astigmatism. However, the skilled optician would not be able to ascertain, based on his eye's perception of the FIG. 3D shadow pattern, what quantitative measure of the transverse ray has been introduced by the non-ideal imaging device. For example, one's eye perception alone would preclude the optician from answering quantitative questions such as: how many waves of trefoil? how many waves of quadrafoil? etc.

We have now discovered, in sharp contrast to the extant literature and methods, an improved Foucault knife-edge test. The improved test of the present invention complements the qualitative test, by developing a quantitative interpretation of the imaging device's characteristics. An important advantage of our discovery, accordingly, is that the skilled optician is now enabled to quantitatively answer the questions poised above: that is, for example, the optician can now say, "the imaging device has 0.05 waves of trefoil, or 0.75 waves of quadrafoil."

Note that this advantage is most significant. For example, we are working in a field where there has been a long-felt need to combine the inherent advantages of a method like the sensitive, if qualitative, Foucault knife-edge method, with some sort of very high precision, quantitative method. The combination, for example, would enable one to more efficiently synthesize a desired imaging device, as opposed to merely analyzing it in a qualitative manner. The present invention, for the first time, addresses and satisfies this need.

Furthermore, our invention has a critical advantage since it can enable the skilled optician to apply, in an efficient manner, the general principles of the Foucault test to the testing of a segmented optic (in contrast to the historic testing of only a monolithic imaging device, like that of the lens 12, supra). As shown below, our quantitative capability can be exploited to resolve questions of any ambiguities that may arise in the context of the testing of the segmented optic.

The present invention, accordingly, provides a method suitable for determining a wavefront aberration over an entire surface of an optical sample, the optical sample being tested in a Foucault knife-edge test assembly, the assembly comprising:

(a) an optical sample to be tested, the optical sample defining a sample space;

(b) a source of radiation directed along a reference axis to the optical sample;

(c) a detection means aligned on the source reference axis, for detecting the radiation imaged by the optical sample, the detection means defining a conjugate sample space, with respect to the optical sample space; and (d) a knife-edge capable of being positioned in a series of knife-edge position steps, for cutting the radiation imaged by the optical sample, thereby producing a variable radiation pattern in the conjugate sample space; the method comprising the steps of:

(1) determining, for each of a plurality of predetermined areas in the conjugate sample space, a radiation reference intensity parameter, based on the knife-edge positioned in a fully occluded, and fully non-occluded position;

(2) positioning the knife-edge through a sequence of discrete positioning steps for generating a family of variable radiation intensity patterns in the conjugate sample space, wherein each member of the variable radiation patterns is a function of knife-edge position, and a function of each predetermined area in the conjugate sample space;

(3) computing for each member of the family of variable radiation patterns, an interpolated knife-edge position in two orthogonal directions;

(4) generating a slope magnitude function for each of the two orthogonal directions, for each of the plurality of predetermined areas in the conjugate sample space; and (5) integrating the slope magnitude functions over each of the two orthogonal directions, over each of the plurality of predetermined areas in the conjugate sample space.

BRIEF DESCRIPTION OF THE DRAWING

The invention is illustrated in the accompanying drawing, in which.

DETAILED DESCRIPTION OF THE INVENTION

We summarize above method steps suitable for employment in a Foucault knife-edge test, and capable of providing a quantitative interpretation of an imaging device's characteristics. As an aid to explaining the details of the steps of the present method, we first make some alterations to the FIG. 1 assembly, shown in FIG. 4, and provide some important comments and heuristics (FIG. 5) on the definitions recited in the summary of the present method.

Figure 1:
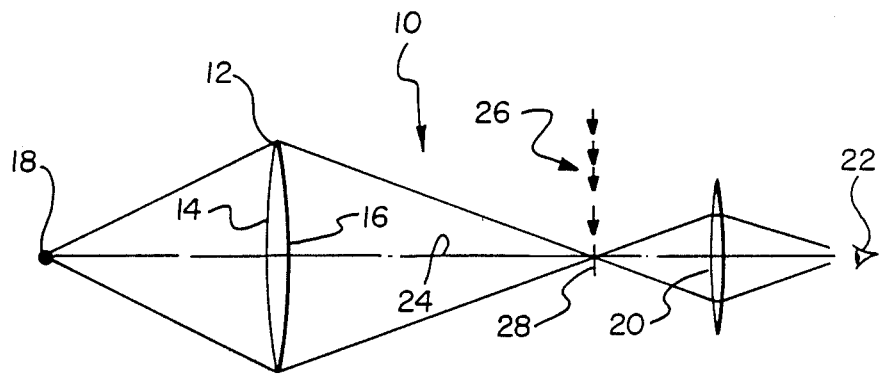
FIG. 1 shows a prior art optical assembly for using the Foucault knife-edge test.
Figure 2A:
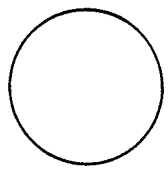
FIGS. 2A-D show shadow patterns generated by an ideal imaging device undergoing the FIG. 1 knife-edge test.
Figure 3A:
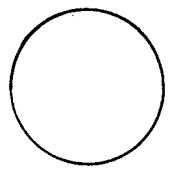
FIGS. 3A-D show shadow patterns generated by a non-ideal imaging device undergoing the FIG. 1 knife-edge test.
Figure 2B:
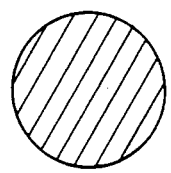
Figure 3B:
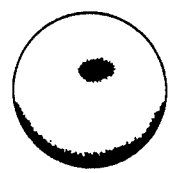
Figure 2C:
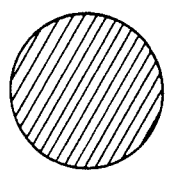
Figure 3C:
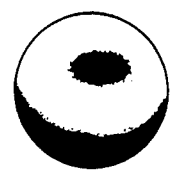
Figure 2D:
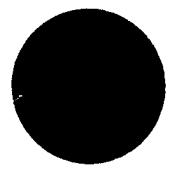
Figure 3D:
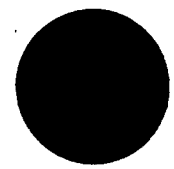
Figure 4:
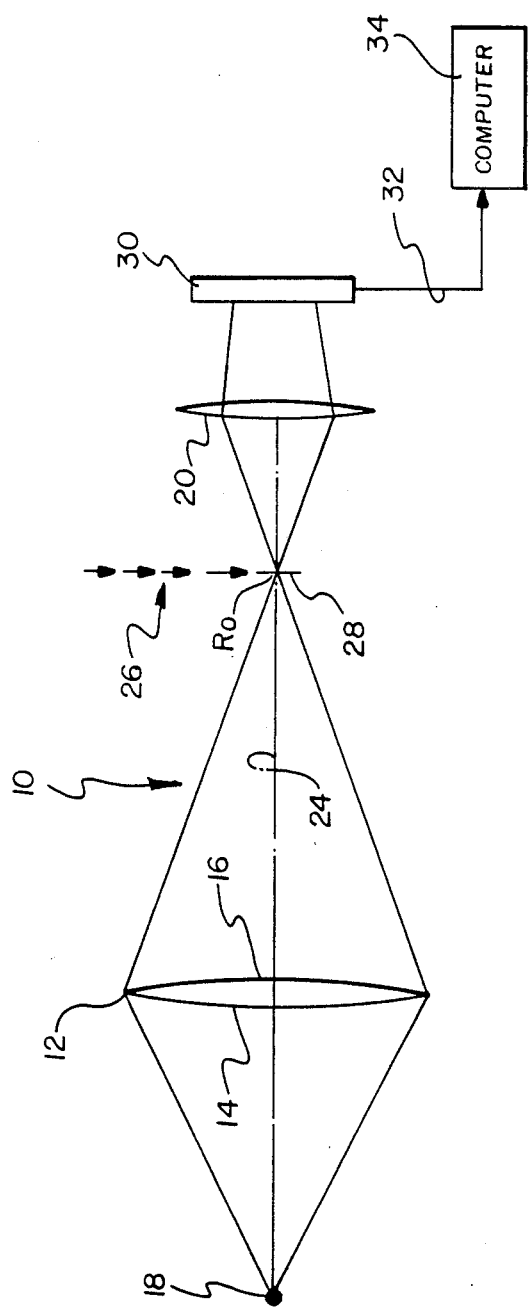
FIG. 4 shows a modified FIG. 1 optical assembly, to illustrate one embodiment of the present invention.

FIG. 4, accordingly, shows the basic FIG. 1 Foucault assembly 10, but modified to help realize the quantitative aspects of the present invention. It is first noted that the eye has been replaced by a conventional photodetector 30. For example, the photodetector 30 may comprise a matrix (mxn) array of conventional charge coupled devices (CCD) or charge injection devices (CID), where m is preferably from 64 to 1024, and n is preferably from 64 to 1024. The photodetector devices 30 can function, as is well known, to collect the radiation imaged by the imaging device 12 under test, and output, for each element in the matrix, a value proportional to the radiation intensity at that element. For our purposes, a preferred photodetector 30 comprises a CID-TEC Corporation Model No. TN 2250A2.

FIG. 4 shows that the output of the photodetector 30 may be fed along a line 32 to a conventional computing means 34. The computing means 34 preferably comprises a computer, for example, a Hewlett Packard Vectra ES.

For purposes of pedagogy, the following definitions, first summarized above, are now detailed, and reference is also made to FIGS. 4 and 5.

We have asserted that the optical sample to be tested, shown in FIG. 4 as the lens 12, defines a "sample space", and that the radiation imaged by the sample can be detected by the detection means (here, the photodetector 30), the detection means, in turn, defining a "conjugate sample space" with respect to the lens sample space.

Figure 5A:
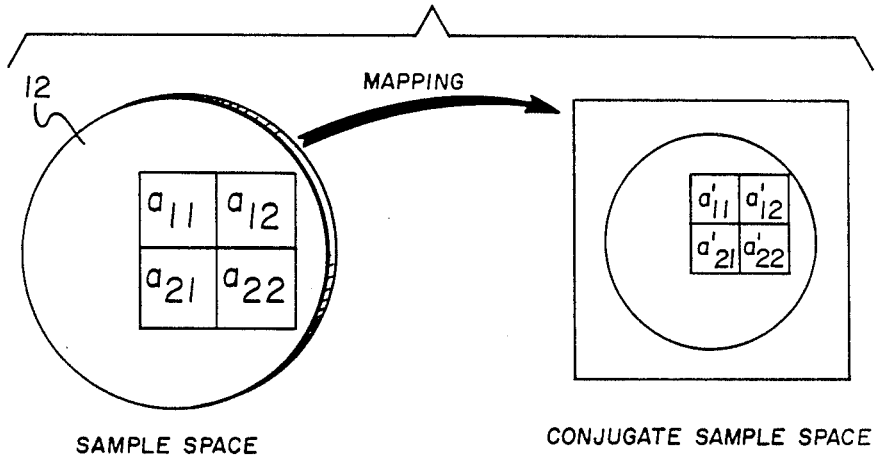
FIGS. 5A, B are heuristics to help explain definitions used in the present invention.

FIGS. 5A, B illustrate two such sample spaces, and corresponding conjugate sample spaces. In particular, the FIG. 5A definition follows from the fact that the radiation incident to the FIG. 4 photodetector 30, corresponds to the conjugate image of an entrance pupil defined by the imaging device (lens 12) under test. The FIG. 5A sample space, therefore, can be thought of as an identifier or label for the lens 12, once the lens 12 has been divided up into a plurality of predetermined areas comprising an array of matrix cells.

In order to illustrate this concept throughout the rest of this description, we define the sample space and its conjugate sample space to each comprise a square matrix ($2 \times 2$), in correspondence with a CID matrix array. Radiation imaged from each of the plurality of predetermined sample space matrix cells ($a_{11}$, $a_{12}$, $a_{21}$, $a_{22}$) may be isomorphically mapped (by way of the collector lens 20) to one of a plurality of corresponding and predetermined areas or matrix the conjugate sample space ($a'_{11}$, $a'_{12}$, $a'_{21}$, $a'_{22}$).

Figure 5B:
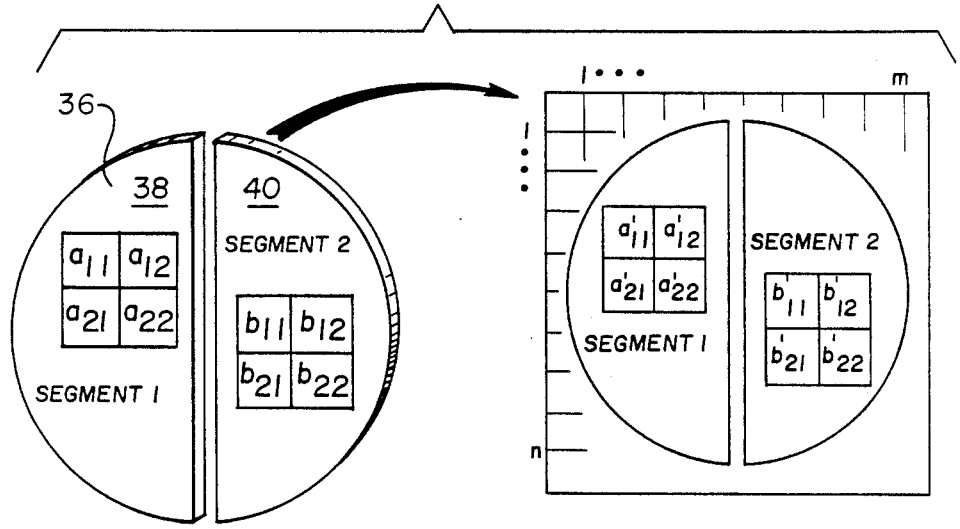

Note that the isomorphic mapping, demonstrated in relation to FIG. 5A, can be exploited to resolve the ambiguities (alluded to above) that may be attendant in testing a segmented optic 36, shown in FIG. 5B. Thus, as FIG. 5B shows, even though the segmented optic 36 has a pair of discrete portions 38, 40 in the sample space, the isomorphic mapping (i.e., the matrix [A], or the matrix [B]) can provide a unique "signature" as to which segment, 38 or 40, has generated a conjugate sample space radiation pattern.

Note further that the FIGS. 5A, B square matrices ($2 \times 2$) are merely exemplary, and that in a preferred embodiment, the matrices may be enlarged to, for example, ($512 \times 512$) predetermined areas.

Note, finally, that with suitable mathematical transformations, in accordance with the isomorphics of the mapping, all subsequent references to mathematical actions in the conjugate sample space, may be done, alternatively, as if they were done directly in the sample space.

A preferred assembly (FIG. 4) of the present method has now been set forth, as well as explanations of definitions (FIG. 5) employed in the method. We therefore turn our attention to a detailed description of each of the five method steps summarized above.

Step 1: Determining, for each of a plurality of predetermined areas in the conjugate sample space, a reference intensity parameter based on the knife-edge positioned in a fully occluded, and fully non-occluded position.

Step 1 expresses in words an idea developed mathematically in both FIGS. 6 and 7. In particular, FIG. 6 develops step 1 for the case of a perfect sample to be tested, while FIG. 7 develops step 1 for the case of a non-perfect or aberrated sample to be tested.

Figure 6A:
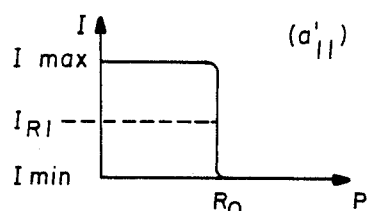
FIGS. 6A-D comprise a family of curves that explain a first step of the present invention, for the case of a perfect imaging device.
Figure 7A:
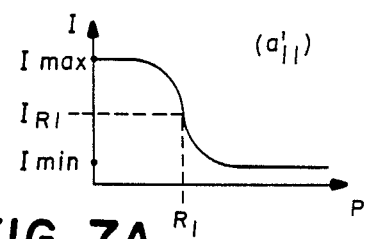
FIGS. 7A-D comprise a family of curves that explain a first step of the present invention, for the case of a non-perfect imaging device.
Figure 6B:
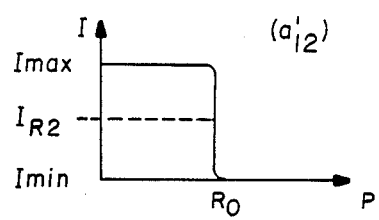
Figure 7B:
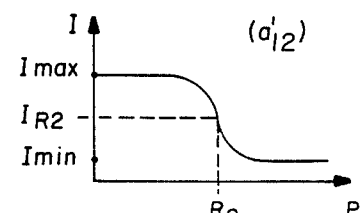
Figure 6C:
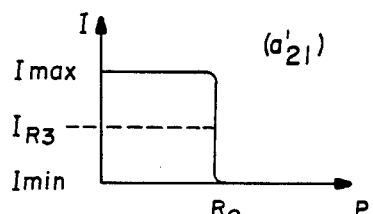
Figure 7C:
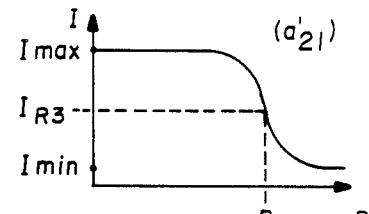
Figure 6D:
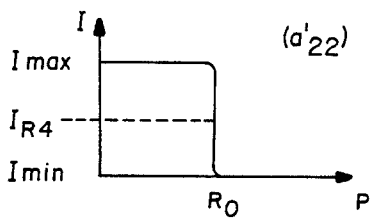
Figure 7D:
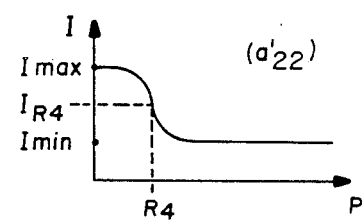
Figure 8A:
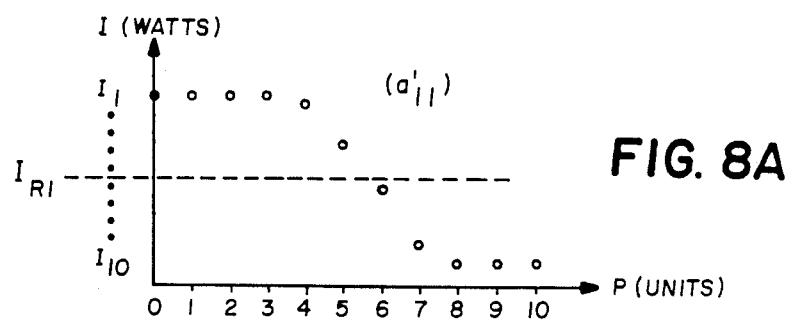
FIGS. 8A-D comprise a family of curves generated in accordance with a second step of the present invention.
Figure 8B:
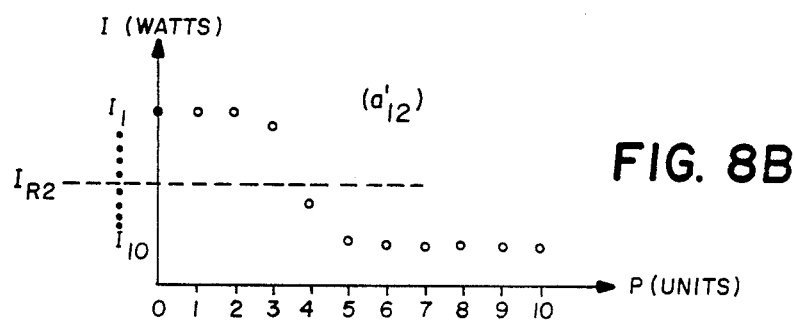
Figure 8C:
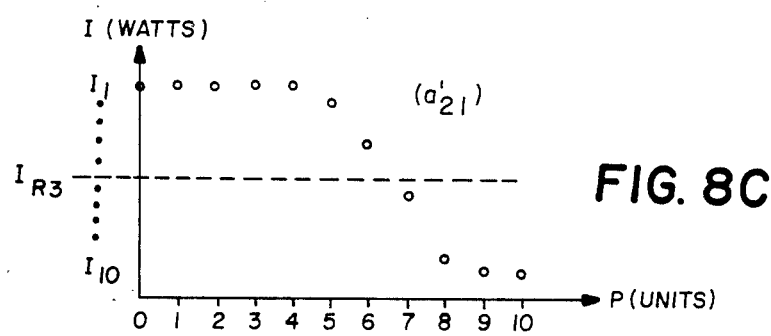
Figure 8D:
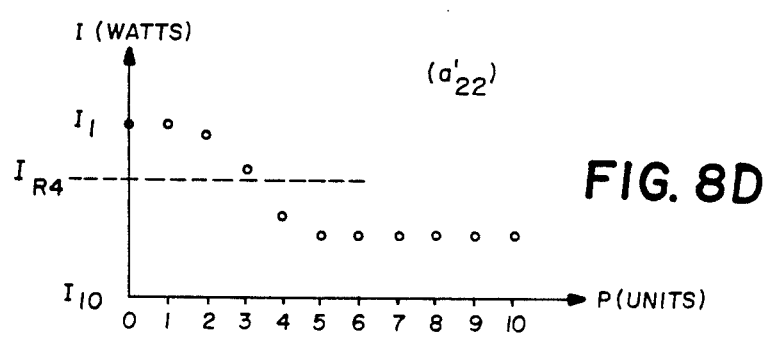

FIG. 6, accordingly, shows a family of curves (FIGS. 6A, B, C, D). Each of these curves corresponds to one of the plurality of four predetermined areas ($a'_{11}$, $a'_{12}$, $a'_{21}$, $a'_{22}$) in the conjugate sample space of FIG. 5A. Each of the curves, moreover, is substantially the same i.e., each provides a relationship of intensity (I) versus knife-edge position (P) for the two extreme knife-edge positions (fully non-occluded, fully occluded). Further, each of the curves is substantially piecewise linear, with a sharp break at a reference point $R_o$. $R_o$ is defined to be a reference knife-edge position, and corresponds to that point in the FIG. 4 assembly 10 where the knife-edge 26 precisely touches the reference axis 24, at the normal, thereby totally occluding the imaging device 12 to be tested.

The FIG. 6 family of curves has a piecewise linear profile, with a nearly 90° break point, and a substantial identity of form, because they have been generated, as stated, by a perfect lens. In other words, each of the predetermined areas ($a_{11}$, $a_{12}$, $a_{21}$, $a_{22}$) of the sample space of the perfect lens comprises a substantially identical radius of curvature i.e., by definition, there are no inherent aberrations in the perfect lens. Accordingly, the members of the FIG. 6 family of curves, which curves express the sample space as mapped into the conjugate sample space, are substantially identical and piecewise linear.

Continuing, step 1 requires determining, for each of the curves (FIG. 6A, B, C, D), a reference intensity parameter $I_R$, where $I_R$ may be determined based on the knife-edge 26 being positioned first in a fully occluded, and then a fully non-occluded position (or vice versa). (Also note that the reference intensity parameter $I_R$ can be obtained by holding the knife-edge 26 in a fixed position, and moving the focused image of the radiation source 18 across the knife-edge). Since the fully occluded position corresponds to an intensity $I_{minimum} \cong 0$ watts, and the fully non-occluded position corresponds to an intensity $I_{maximum} = I_{max}$ watts (both as measured by the photodetector 30) a preferred reference intensity parameter $I_R$) may be computed by averaging $I_{min}$ and $I_{max}$:

$$I_R = \frac{I_{max} + I_{min}}{2}. \tag{1}$$

Step 1 is now analyzed for the case where the perfect lens is replaced by a non-perfect or aberrated lens. The action of sequentially positioning the knife-edge 26 at the extreme positions, fully occluded and fully non-occluded, can generate a family of curves of the type shown in FIGS. 7A–D. Here, each of the curves corresponds to one of the plurality of four predetermined areas ($a'_{11}$, $a'_{12}$, $a'_{21}$, $a'_{22}$) in the conjugate sample space of FIG. 5A. Each of the FIG. 7 curves, however, may not be substantially the same, as they were in FIG. 6 for the case of the perfect lens. In fact, each of the curves may be arbitrary, due to arbitrary radii of curvature that indeed characterize the non-perfect lens. However, it can be stated that each of the curves in the FIG. 7 family, corresponds to a mathematical real and monotonically decreasing function, so that each of the curves continuously falls off from a maximum intensity ($I_{max}$), to some lower minimum intensity $I_{min}$.

It may be observed at this point, that a crucial advantage of the present invention is that one does not need to know the exact mathematical expression of each of the FIG. 7 curves. For the present invention, it is merely sufficient to know a finite number of sampled, discrete pairs of variables $I_{ordinate}$, $P_{abscissa}$). This is discussed more fully below.

Finally, step 1 requires determining, for each of the curves (FIG. 7A, B, C, D), a reference intensity $I_R$). $I_R$ may be expressed by equation (1) above, and computed in the same manner as for the perfect lens, by averaging the intensities generated by the two extreme knife-edge positions i.e., fully occluded, and fully non-occluded.

To review step 1, it should be clear that for either the perfect lens (FIG. 6) or non-perfect lens (FIG. 7), step 1 comprises generating a family of reference intensity parameters, ($I_{R1}$, $I_{R2}$, $I_{R3}$, $I_{R4}$), derived from computations computed for each of the predetermined areas in the conjugate sample space. Step 1 is preferably executed by the FIG. 4 computer 34, along the lines detailed above for both FIGS. 6 and 7. The computer 34 preferably stores in a memory the family of reference intensity $I_R$) parameters, for subsequent operation in step 3 of the method.

Step 2: Positioning the knife-edge through a sequence of discrete positioning steps, for generating a family of variable radiation intensity patterns in the conjugate sample space, wherein each member of the family is a function of knife-edge position, and a function of each predetermined area in the conjugate sample space.

Step 2 expresses in words an idea developed mathematically in FIGS. 8A–D. In particular, FIGS. 8A–D comprise a family of four curves as generated from a non-perfect lens. Each of the curves provides an example of a function dedicated to one of the four predetermined areas ($a'_{11}$, $a'_{12}$, $a'_{21}$, $a'_{22}$) in the FIG. 5A conjugate sample space. Further, each function is a plot of discrete knife-edge position (P) versus radiation intensity (I). Actual sampled points (10) for each function, shown as little circles, may be generated in the following way.

First, the FIG. 4 knife-edge 26 may be positioned at a first position P=1 unit. This action, in turn, blocks some of the radiation from the source 18, so that a radiation intensity number $I_1$ may be registered by the photodetector 30, for each of the predetermined areas in the conjugate sample space. The set of intensity numbers, so generated, may be transmitted to the computer 34, along the line 32. The set of intensity numbers corresponds to a first set of sampled, discrete pairs of variables (knife-edge position ($P_1$), intensity ($I_1$)), as shown by way of the FIG. 8 little circles.

Second, the FIG. 4 knife-edge 26 may be positioned at a second position P=2 units. This action, in turn, further blocks some of the radiation from the source 18, so that a new and second set of radiation intensity numbers may be registered by the photodetector 30, again for each of the predetermined areas in the conjugate sample space. The second set of intensity numbers, so generated, may be transmitted to the computer 34, along the line 32. The second set of intensity numbers corresponds to a second set of sampled, discrete pair of variables (knife-edge position ($P_2$), intensity ($I_2$)), as shown by way of the FIG. 8 little circles.

This process of re-positioning the knife-edge 26 to third, fourth, fifth position units, etc., may be repeated for any finite number of desired knife-edge 26 position units. (Note that this process can also be effected by holding the knife-edge 26 in a fixed position, and stepwise moving the focused image of the radiation source 18 across the knife-edge 26). Preferably, the re-positioning process is repeated more times, rather than fewer times, to ultimately provide a greater quantitative accuracy in the Foucault method. On the other hand, the trade-off to an exceptionally high number of process repetitions and hence greater quantitative accuracy, for example, greater than 20 repetitions, may be increased computer time or expense.

Step 3: Computing for each member of the family of variable radiation patterns, an interpolated knife-edge position.

As just detailed, the second step of the method generates a family of variable radiation patterns in the conjugate sample space. An example of the family of radiation patterns is that generated above in FIGS. 8A–D. We reprint one of these patterns (FIG. 8A), as FIG. 9, in order to illustrate the present step 3. It is to be understood that the third step, as detailed below in relation to FIG. 9, is actually repeated by the computer 34, mutatis mutandis, for each of the four predetermined areas that actually comprise the FIG. 8 family of radiation patterns.

Figure 9:
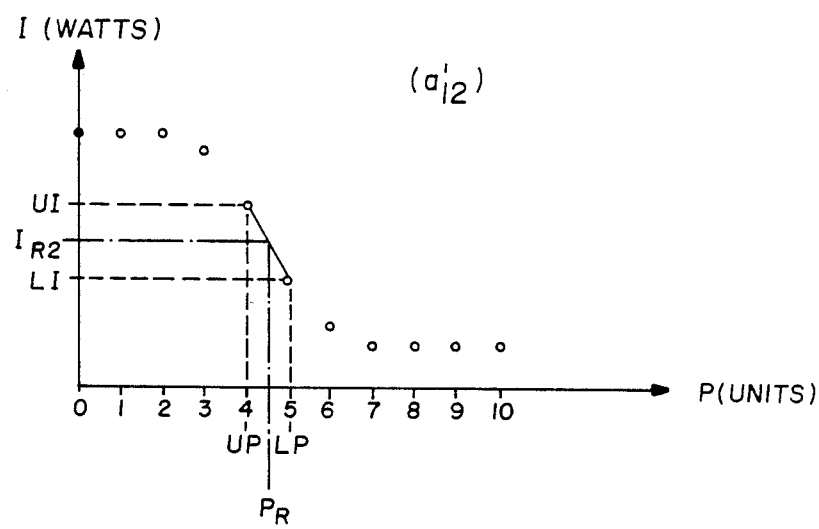
FIG. 9 is a function generated in accordance with a third step of the present invention.

FIG. 9, accordingly, comprises a radiation function for one of the predetermined areas ($a'_{12}$) in the conjugate sample space. It is a plot of knife-edge position (P) versus intensity (I), with position denoted in units, and intensities denoted in watts. The little circles indicate discrete, knife-edge position sample points.

Since FIG. 9 in fact provides only discrete sample points, it should be graphically clear that a precise knife-edge position $P_R$, which corresponds to the known intensity parameter $I_R$ (from step 1), is, in the general case, unknown at this moment. It is the objective of step 3 to precisely determine $P_R$, for the following reasons.

A quantitatively precise determination of $P_R$ enables one to exploit the following equation (2), so as to arrive at a quantitative interpretation of the imaging device's characteristics:

$$\frac{P_R}{R_C} = \text{magnitude of wavefront slope aberration} \qquad (2)$$

Equation (2) states that the quotient of the knife-edge position $P_R$, divided by a radius of curvature $R_C$, where $R_C$ is a measurable radius from the knife-edge 26 to a location where we choose to characterize the wavefront, namely, the surface of the imaging device 12 under test, is proportional to the magnitude of the wavefront slope aberration.

With this motivation, therefore, we return to FIG. 9 and step 3, for instructions on how to precisely determine the knife-edge position, $P_R$.

The knife-edge position $P_R$ is preferably given by the following linear, hence interpolated, equation (3):

$$P_R = \frac{1}{m}(I_R - LI) + LI, \qquad (3)$$

where m is the slope of a straight line between the points UI, UP and LI, LP. With reference to FIG. 9, UI is defined as an upper intensity point; LI is defined as a lower intensity point; UP is defined as an upper position point; and, LP is defined as a lower position point. More specifically, based on these definitions, the slope m may be expressed by equation (4):

$$m = \frac{UI - LI}{UP - LP}. \qquad (4)$$

There remains the question, how are the variables (UI, UP) and (LI, LP) quantitatively determined? The question is preferably answered by way of the following program/example.

First, for each discrete, sampled point in the FIG. 9 curve, a comparison is made as to whether or not the intensity I is greater than the known intensity parameter $I_R$ (from step 1). If I is greater than $I_R$, the program stores in memory the immediate values of intensity (UI) and position (UP), and then advances to the next discrete, sampled point. Assume now, that this value I is below that of $I_R$. Then, the program recalls from memory the last stored values, namely, UI and UP, and saves the immediate intensity and position, as LI and LP, respectively. In review, these numbers (UI, UP) and (LI, LP), are processed through equations (4), (3) and (2) supra, to arrive at the quantitative interpretation of the imaging device's characteristics.

Note finally, that the numbers (UI, UP) and (LI, LP), may be generated, in an alternative reverse procedure, from that just specified. Thus, by now working backwards, along the FIG. 9 curve, from the more fully occluded knife-edge position, to the less fully occluded knife-edge position, one can equivalently determine when I is, for the first time, greater than $I_R$. This occurrence signifies the point to register the values of (UI, UP) and (LI, LP), for insertion in equations (4), (3), and (2) supra.

Introduction to Steps Four and Five

As an introduction to the steps four and five, we first make the following observations on the first three method steps. First, it has been shown that equation (2), which can be developed from the three method steps, is a measure of the magnitude of the wavefront slope aberration. Implicit in equation (2), however, is the fact that the magnitude of the slope aberration has components in two orthogonal directions (x and y), reflecting the fact that, mathematically, the imaging device 12 can be thought of as a two-dimensional manifold embedded in three-dimensional space. The following equations (5) and (6) break down equation (2), in order to explicitly show the two orthogonal slope components, namely $\theta_x$ and $\theta_y$:

$$\theta_x = \text{magnitude of slope} = \frac{-\partial \Delta\omega(x,y)}{n\partial x} \quad (5)$$
aberration in x direction $$\theta_y = \text{magnitude of slope} = \frac{-\partial \Delta\omega(x,y)}{n\partial y} \quad (6)$$
aberration in y direction where n=an index of refraction of a medium that the imaging device 12 is being tested.

The dual Equations (5) and (6), accordingly, explicitly express the two orthogonal slope components implicit in equation (2), and introduce, moreover, their equivalency to the partial differential of a function $\Delta\omega(x,y)$. The function $\Delta\omega(x,y)$ is defined as an optical path difference (OPD) or wavefront deformation, induced by the imaging device 12.

Now, a quantitative assessment of the optical path difference $\Delta\omega$, as provided by the dual equations (5), (6), in contradistinction to that of the slope magnitude expressed in equation (2), is important, since it uniquely enables one to eliminate possible ambiguities of aberration discernment, that may be inherent in equation (2), alone. For example, using equation (2), and noting that the orthogonal slope components $\theta_y$, $\theta_x$ are as yet only implicit, one may ambiguously confuse trefoil as quadrafoil, or astigmatism as trefoil, etc. On the other hand, these ambiguities of aberration discernment, as just noted, may be eliminated by simultaneously solving equations (5) and (6). This is true because the equation (2) ambiguity results from not appropriately combining the orthogonal slope components $\theta_x$, $\theta_y$, a capability now restored by simultaneously solving equations (5) and (6).

Step 4: Computing a slope magnitude function for each of two orthogonal directions, for each of the plurality of predetermined areas in the conjugate sample space.

Figure 10:
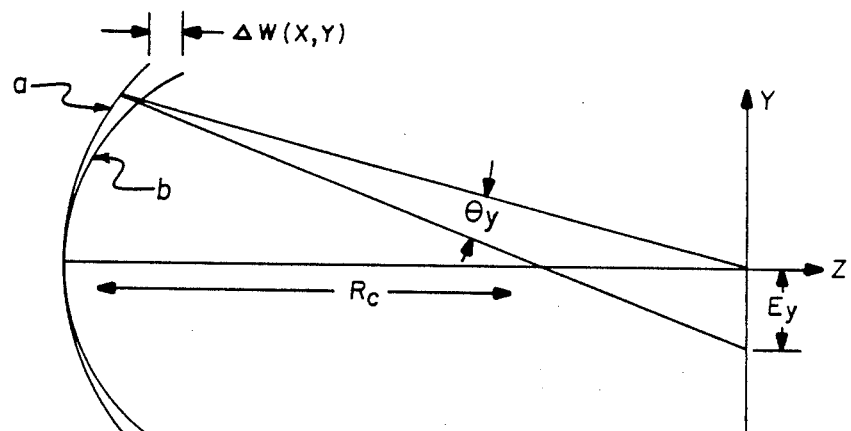
FIG. 10 shows a cross-section of a wavefront optical path difference (OPD)

Step 4 expresses in words an idea developed in FIG. 10. FIG. 10 shows a $\theta_y$ component (a $\theta_x$ component would be substantially identical, in principle) of a cross section of an optical path difference function $\Delta\omega(x,y)$. As can be seen in FIG. 10, $\Delta\omega(x,y)$ is the optical path difference between an ideal wavefront (a) of the imaging device 12, and its aberrated wavefront (b), in one of the plurality of predetermined areas in the conjugate sample space.

Figure 11A:
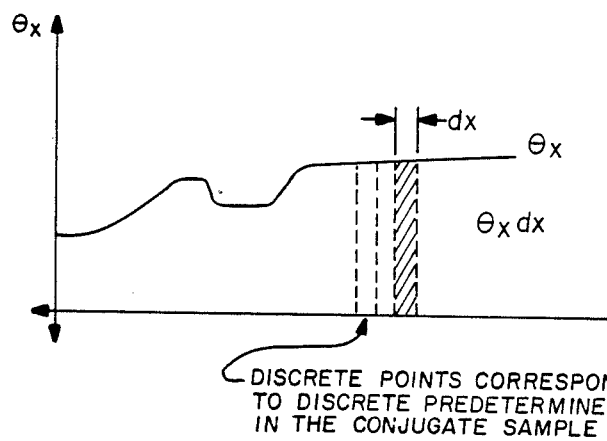
FIGS. 11a, b comprise a slope magnitude function and its integral, generated in accordance with a fourth step of the invention.

Step 4 requires computing a slope magnitude function for the FIG. 10 $\theta_y$ component. This, in turn, is implicitly known, from equation (2) above. Step 4 requires, moreover, computing this slope magnitude function for the $\theta_x$ component; and, for the $\theta_y$ and $\theta_x$ components for each of the plurality of predetermined areas in the conjugate sample space. This last action, accordingly, generates slope functions $\theta_x$ and $\theta_y$, as shown, for example, in FIG. 11, for $\theta_x$.

Step 5: Integrating the slope magnitude function over each of the two orthogonal directions, over each of the plurality of predetermined areas in the conjugate sample space.

The motivation for step 5 is the insight that the desired imaging device wavefront surface deformation $\Delta\omega(x,y)$, can be computed by integrating the dual equations (5) and (6). That is, $$\Delta\omega(x,y)_x = \frac{n}{R_c} \int \theta_x dx = \frac{-n}{R_c} \int \left[ \frac{\partial \Delta\omega(x,y)}{\partial x} \right] dx \quad (7)$$

$$\Delta\omega(x,y)_y = \frac{n}{R_c} \int \theta_y dy = \frac{-n}{R_c} \int \left[ \frac{\partial \Delta\omega(x,y)}{\partial y} \right] dy. \quad (8)$$

Thus, since $\theta_y$ and $\theta_x$ are now known, as generated by step 4, their integral in step 5, in turn, generates the desired imaging device wavefront deformation $\Delta\omega$.

Figure 12:
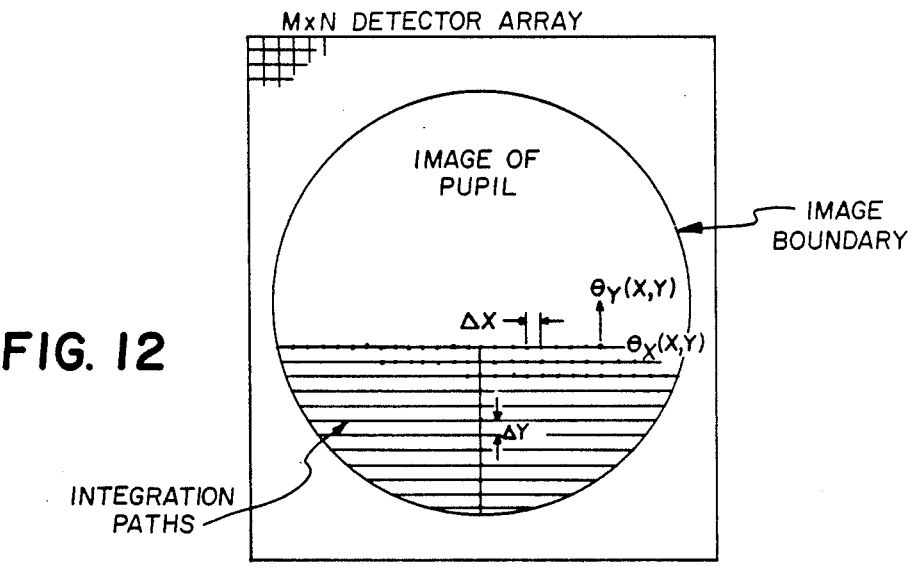
FIG. 12 shows integration paths in a conjugate sample space, as defined in accordance with a fifth step of the invention.

A preferred method for solving the integration equations (7) and (8), and setting the indefinite integration limits, is by way of a discrete numerical computation, as disclosed in FIG. 12.

FIG. 12 shows the conjugate sample space cross-gridded by integration paths comprising parallel rows ($\theta_x$), and parallel columns ($\theta_y$) which are orthogonal to the rows. The limits of the indefinite integrals (equations (5) and (6)), accordingly, are the bounding points of the integration paths, in turn, circumscribed by the image of the pupil of the imaging device 12. The integration is preferably performed first by predetermined, discrete intervals ($\Delta x$) along a first row, from one bounding point to another, and then, in sequential rows offset from the first row by a second predetermined interval ($\Delta y$), until the entire conjugate sample space has been integrated.

Figure 11B:
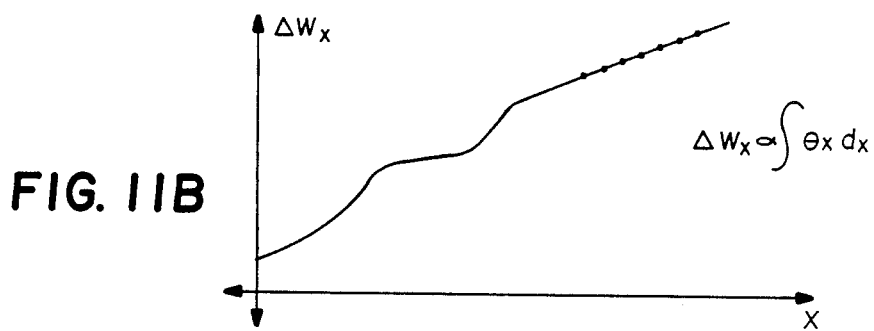

With reference back to FIG. 11a, it may be observed that this integration procedure corresponds to determining the area under the $\theta_x$ function, to thus generate an optical path difference function of the type shown in FIG. 11b. In particular, the area is preferably determined in accordance with the well-known trapezoidal method. Alternatively, the area may be determined in accordance with the well-known rectangular, straight square or spline fit methods. (The area under the $\theta_y$ function, not shown, may be determined analogously).

Figure 13:
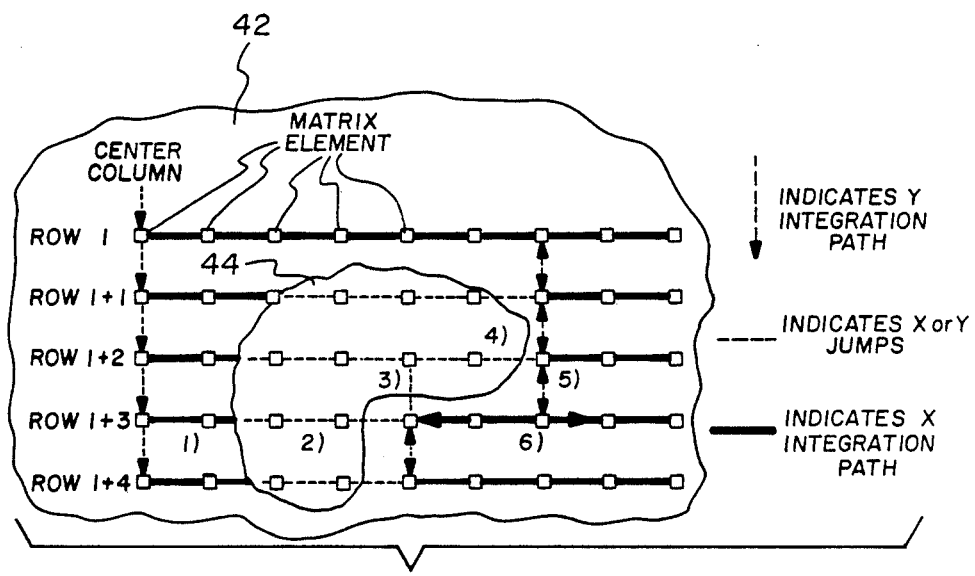
FIG. 13 shows alternative integration paths to those of FIG. 12, for the case of obstructions in the integration paths.

We have discovered, in conjunction with step 5, that it is possible that an obstruction boundary can exist within the conjugate sample space, thus necessitating a modified integration method from that just specified. For example, FIG. 13 shows a conjugate sample space 42 having an obstruction 44, the obstruction 44 being an area for which no radiation intensity data exists. An obstruction can be caused, for example, in a Cassegrainian telescope, where a physical obstruction, namely, a secondary mirror, obstructs an imaging device to be tested. For this situation, therefore, as just alluded to, a modified integration method is desirable.

With continued reference to FIG. 13 and its six arrow steps, a preferred modified integration method comprises the steps of:

(1) integrating (in a manner specified above for step 5) until an obstruction occurs at a matrix element located within one of the predetermined areas making up the conjugate sample space;

(2) stepping along this row (no integration) until a matrix element is not obstructed;

(3) jumping to the same step in a previous row;

(4) stepping along the previous row until the matrix element is unobstructed;

(5) integrating from the previous row, first unobstructed matrix element, to the current row; and (6) integrating backwards to the obstruction, then forward to the end of the row.

APPENDIX

A computer program in accordance with the five steps of the present method, as specified above and in the Figures, written in C language, is now listed. Note that this computer program contains material to which a claim of copyright is made. The copyright owner does not object to copying the patent document but reserves all other rights.

STEP 1

```c
/************************************************************************/
/*                                                                      */
/*           function  do_initialization...                             */ void do_initialization(FILE *hi_val, FILE *lo_val,FILE *hi_pos,FILE *lo_pos,
                       short *x_center,short *y_center,float *outer_radius,
                       float *inner_radius, char *optical_setup)

{
    unsigned char    pixel_value, hi_average, low_average;
    unsigned char    one_row[512], max_pixel;
    short            row, col, cutoff, max_row;
    long             pixel_count, total,offset;

max_row = 479;

scroll(3);
    printf("Please cutoff source so I can take a dark reading. Hit 'g' when ready.\n");
    while(getch() != 'g')  ; /* wait here for 'g' */ avg_frames(no_of_frames);
    cframe(FB0,FB0,ALOW,B1);/* copy result to B1*/ fb_access(FRAMEB,NOSCAN,SCAN);

fb_settmode(Z_MODE);
    video(); /* return to normal viewing mode */
    printf("Please wait for a moment.\n");

max_pixel = 0; /* initialize max pixel value */
    for(row = 0; row <= max_row ; row++)
    {
        fb_rhline(B1,0,row,512,one_row);/* read in a row at a time */
        for(col=0;col< 512;col++)

if(one_row[col] > max_pixel) max_pixel = one_row[col];
            /* if bigger than max pixel replace */
    } /* max pixel has been found */
    cutoff = max_pixel + 25 ; /* leave room for noise */ scroll(3);

printf("Please set up system full open. Ajust system to get desired image on the camera\n");
    printf("When you are ready to do the hi value grab hit 'g'\n");
    while (getch() != 'g') ;/* wait here til g is hit */
```

```
    avg_frames(no_of_frames);  /* go have system grab a frame */
    adi_cpssel(VDC,VDAL,VDAL,VDAL);
    fb_access(FRAMEA,SCAN,NOSCAN); /*set to read FRAMEB */
    fb_settmode(Z_MODE);

total = 0;   /* initialize value of summ of all pixels */
    pixel_count = 0;

for(row=0;row<=max_row;row++)
    { fb_rhline(ALOW,0,row,512,one_row);/* read in a row at a time */
       for(col=0;col< 512;col++)
       { if(one_row[col] < cutoff )
            status_array[row][col] = 0; /* identify pixel as not being used */
          else
          {
             status_array[row][col] = 1; /* set pixel flag to indicate low
                                            value */ total += one_row[col];
             pixel_count++;
          }
       }
       if( (row % 100) == 0 ) printf("Row %4d done.\n",row);
       /* print status or every 100th row */

} /* pixels stored and active ones identified */
    hi_average = total/pixel_count;

avg_a_and_b1();  /* average the two averages */
    cframe(FB0,FB0,ALOW,B2);  /* copy average to B2*/
    fb_setsmask(FRAMEB,0xFF00); /*protect B2 */
    fb_access(NONE,SCAN,SCAN);
    fb_vbsel(B2);
    adi_cpssel(VDC,VDB,VDB,VDB);
    printf("On the monitor is a display of your average values. Hit a key to proceed. \n");
    getch();

identify_segments(cutoff); /* go and define segments if required */ video();

scroll(10);
    average_mid_point = hi_average/2;
    /*threshold_output_luts(1,mid_average); /* binarize output lut 1 to*/
    scroll(5);
    printf("The high and low values are stored please wait while I find the image boundaries.\n");
    find_boundaries(x_center,y_center,outer_radius);

scroll(10);
    printf("I will now locate the obstructions.\n");

find_obstruction(*x_center,*y_center, top, bottom, left,right,
                     *outer_radius);
    printf("Here is a mapping of your working space..\n");
    show_area();

/*reduce_aperture(*y_center,*x_center,*outer_radius);  */
    /*reduce the aperture if desired*/

/*pad_obstructions();*/
    /*put a dead area around obstructions */
}

/*                                                                      */
/*                                                                      */
```

```c
/****************************************************************/
/*                                                              */
/*              function ... save_midpoints()                   */ void save_midpoints(FILE *hi_file, FILE *lo_file)
{
  int           row, col;
  unsigned char pixel, hi_avg, lo_avg;
  long          offset;

fb_access(FRAMEB,SCAN,NOSCAN); /* set up B2 to store values */
  for(row=0;row<=511;row++)
  {
    printf("Starting row# %4d...",row);
    for(col=0;col<=511;col++)
    {
      if(status_array[row][col] == 0)
        fb_wpixel(B2,col,row,0);
      else
      {
        offset = 512*row + col; /* calc position for file pointer */
        fseek(hi_file, offset, SEEK_SET); /* move pointers to */
        fseek(lo_file, offset, SEEK_SET); /* correct location */
        fread(&hi_avg, 1, 1, hi_file); /* read in high value */
        fread(&lo_avg, 1, 1, lo_file); /* read in low value */
        pixel = (hi_avg-lo_avg)/2; /* calc avg */
        fb_wpixel(B2,col,row,pixel); /* store the value in B2 */
      }
    }
    printf("completed.\n");
  }
}
/*                                                              */
/*                                                              */
/****************************************************************/
```

CTF2

```c
/****************************************************************/ signed char huge  status_array[512][512];/* array to define status of point*/
  /* create a global array to be used for intermediate processing
     of the image array at any point in time. */

FILE          *hi_value, *lo_value, *hi_position, *lo_position;
  FILE          *Ex, *Ey;
  FILE          *Side1, *Side2;
  int           top, bottom, left, right; /* variables showing working area */
  extern int    bur_AX, DDD;              /* global variables for inchworm */
  extern float  bur_datapassed;           /* these are in the driver to be linked */
  float         microns_per_step, microinches_per_step;
  float         average_mid_point;
  int           no_of_frames, reference_row, reference_col;
  float         avg_mid_point;
  long int      number_of_active_pixels=0, ignored_pixels=0;
  double        Ex_half_1 =0,Ex_half_2 = 0,Ey_half_1=0,Ey_half_2 =0;
  long int      Pixels_in_one =0, Pixels_in_two = 0;

main() /* start of main procedure */
{
  unsigned char bin_val, ch;
  short         row, col, step, record_number, max_row, max_col;
  short         min_row, min_col,i, j, line, no_to_avg;
  short         no_of_steps,steps_moved;
  long int      total_completed;
  char          direction, at_start, all_pixels_done, view_type;
  int           average_midpoint,boundary;
```

```c
    float       start_ratio = 0.0075;  /*% of pixels which have to switch to start */
    float       stop_ratio  = 0.9925;  /* % of pixels which have to switch to stop */

/* pointers to the files containing the data */ scroll(25);
    printf("This is the Knife Edge Test program. Please get all of the equipment\n");
    printf("ready then hit any key.");
    ch=getch(); /* wait here for key to be hit */ printf("Now we are ready to start the test.. How many frames do you want to\n");
    printf("average at each step.\n");

scanf("%i",&no_of_frames); /* read in the number to average */ setup_the_system(); /* go do the initialization routine to get midpoints */
    save_configuration();

printf("\nThe total number of active pixels before padding is %ld \n",number_of_active_pixels);

/* number_of_active_pixels = number_of_active_pixels-ignored_pixels;

printf("Total number of active pixels after padding is  %ld\n",number_of_active_pixels); */ printf("Average mid point value = %f.\n",average_mid_point);
    boundary = (int)average_mid_point; /* convert to int */
    printf("Hit a key to continue.\n");
    getch();

video(); /* get video image on screen */ scroll(5);    /* advance 5 lines */
    printf("Good. I will now find the position of best focus. Please manually position\n");
    printf("the knife at a place in front of the focus close to the edge of the beam.\n");
    printf("When you are ready to have me locate the focus hit any key.\n");
    ch=getch(); /* wait here for response */ scroll(25); /*clear screen */
    printf("            ------------------------------------------\n");
    printf("\n");
    printf("            LOCATE KNIFE AT FOCUS.. HIT A KEY WHEN DONE\n");
    printf("\n");
    printf("            ------------------------------------------\n");

getch();

scroll(25);
    printf("What do you want for your step size in microns(0.1 micron res) ?");
    scanf("%f",µns_per_step);
    microinches_per_step = 39.4*microns_per_step*sqrt(2)/2;/* since knife is at 45 deg */
    printf("\n");

/***** call setup to burleigh here  ****/
    init(); /* initialize burleigh system */ bur_AX = -1 ; /* make direction be negative.. ie in direction for testing */
    DDD =-1;
    bur_datapassed = 5*microns_per_step;
    check_direction();
    travel(); /* set up the actual travel per step */ view_type = 'x';
    while(view_type == 'x')
    {
      printf("\n\nDo you want live image(l) or averaged image(a) on the screen?")
```

```
  view_type = getche();
  if((view_type != 'l') && (view_type != 'a'))
  {
    printf("\nPlease respond with an 'l' or an 'a'!\n");
    view_type = 'x';
  }
} scroll(5);
printf("Position the knife just outside the caustic.\n");

printf("Hit s  to start the test.\n");
while((ch=getche()) != 's') printf("\n"); /* keep looking for s */ scroll(25);
printf("Here we go.... \n\n");

/* do the iterations for each step */
threshold(ADI,GREEN,0,255,boundary); /* binarize display at mid value */ direction = 'x';
  at_start = 'n' ;/* initialize flag for knife at start position */
  while(at_start == 'n')
  {
    mvstep();   /* move knife 1 step */
    avg_frames(no_of_frames);/* average the frames into frame A */
    if(view_type == 'l')
    {
      select_path(LOOP_BACK);
      vsi_aq(CONTINUOUS,0);
    }
    total_completed = quick_advance(direction);
    if(total_completed > (long int)(start_ratio*number_of_active_pixels))
      at_start = 'y';

} /* if any pixel has changed due to knife movement you are at edge of caustic */ printf("\n\n\n I have located the edge of the beam I will now start.\n");

swtch_direction(); /*change direction of knife */
  for(steps_moved =1; steps_moved<=1; steps_moved++)
      mvstep(); /* move back 1 steps */
  swtch_direction(); /*go back to original direction */ all_pixels_done = 'n'; /* set flag to indicate all pixels are not done */
  steps_moved = 0; /* initialize # of steps moved */
  total_completed = 0 ;/* initialize total number of pixels completed */
  direction = 'x';
  bur_datapassed = microns_per_step;
  check_direction();
  travel(); /* set up correct travel per step */ while(all_pixels_done == 'n')
  {
    mvstep(); /*move knife one step */
    printf("Working on step # %5d. \n",steps_moved+1);
    steps_moved++;
    avg_frames(no_of_frames);
    if(view_type == 'l')
    {
      select_path(LOOP_BACK);
      vsi_aq(CONTINUOUS,0);
    }
    check_for_crossovers(&total_completed,steps_moved,direction);
    printf("total completed = %ld \n",total_completed);

if(total_completed >= (long int)((1-start_ratio/5)*number_of_active_pixels))
        all_pixels_done = 'y'; /* then indicate that all pixels are done */ if(total_completed <= (long int)(start_ratio*number_of_active_pixels))
        steps_moved = 0; /* define 0 step to be at start of data change */
```

```c
} /* this cut in one direction is done */ find_transverse_ray_aberrations(direction);

/* now to step over to position for other cut */ direction = 'y';
bur_datapassed = 5*microns_per_step;
check_direction();
travel(); /* set up bigger steps to find start */
total_completed=0;
at_start = 'n' ;/* initialize flag for knife at start position */
while(at_start == 'n')
{
  mvstep();   /* move knife 1 step */
  avg_frames(no_of_frames);/* average the frames into frame A */
  if(view_type == 'l')
  {
    select_path(LOOP_BACK);
    vsi_aq(CONTINUOUS,0);
  }
  total_completed = quick_advance(direction);
  if(total_completed > (long int)(start_ratio*number_of_active_pixels))
    at_start = 'y';
} /* if any pixel has changed due to knife movement you are at edge of caustic */ swtch_direction();
for(steps_moved =1; steps_moved<=1; steps_moved++)
    mvstep(); /* move back 5 steps */
swtch_direction();

all_pixels_done = 'n'; /* set flag to indicate all pixels are not done */
steps_moved = 0; /* initialize # of steps moved */
total_completed = 0 ;/* initialize total number of pixels completed */
bur_datapassed = microns_per_step;
check_direction();
travel(); /* set travel to desired amount */ while(all_pixels_done == 'n')
{
   mvstep();   /*move knife one step */
   printf("Working on step # %5d. \n",steps_moved+1);
   steps_moved++;
   avg_frames(no_of_frames);
   if(view_type == 'l')
   {
     select_path(LOOP_BACK);
     vsi_aq(CONTINUOUS,0);
   }
   check_for_crossovers(&total_completed,steps_moved,direction);
   printf("total completed = %ld \n",total_completed);
   if(total_completed >= (long int)(stop_ratio*number_of_active_pixels))
       all_pixels_done = 'y'; /* then indicate that all pixels are done */ if(total_completed <= (long int)(start_ratio*number_of_active_pixels))
       steps_moved = 0; /* make the start the point at which data changes */
} /* this cut in one direction is done */ find_transverse_ray_aberrations(direction);
scroll(25);

fwrite(&Ex_half_1,4,1,Side1);
fwrite(&Ey_half_1,4,1,Side1); /*save avg Ex and Ey for side 1 */
fwrite(&Ex_half_2,4,1,Side2);
fwrite(&Ey_half_2,4,1,Side2); /*save avg Ex and Ey for side 2 */
fclose(Side1);
fclose(Side2);

printf("The testing is done.\n");

printf("Ok all of the data is saved. The file names are as follows: \n");
printf("\n Ex -> X Transverse Ray Aberrations.");
```

```
    printf("\n Ey -> Y Transverse Ray Aberrations.\n");
    printf("\n To reconstruct the surface run 'opd_map'.\n");
    printf("\n After that you can determine the aberrations by running 'zernike'\
n");
    printf(" to determine the zernike aberrations or 'rigidbdy' to determine\n");
    printf(" the rigid body components.\n");
    fprintf(stdprn,"\f\n\n\n\n\r");
    fprintf(stdprn,"Side 1 avgerage Ex = %12.6g     Side 1 average Ey = %12.6g \n
\n\r",Ex_half_1,Ey_half_1);
    fprintf(stdprn,"Side 2 avgerage Ex = %12.6g     Side 2 average Ey = %12.6g \n
\n\n\n\n\n\n\r",Ex_half_2,Ey_half_2);

} /*end of test program */
/*                                                                            */
/*                                                                            */
/****************************************************************************/
```

STEP 3

```
/****************************************************************************/
/*                                                                          */
/*    function   find_transverse_ray_aberrations() .. to do the calcs       */
/*               from the four data files from the test to calc Ex, Ey      */ void   find_transverse_ray_aberrations(char  direction)
    /*
        direction  -> which cut this is   */

{
      FILE              *output_file; /*pointer to output data file */
      unsigned char     mid_point_row[512], hi_values[512], lo_values[512];
      short             hi_positions[512], lo_positions[512];
      float             transverse_aberrations[512]; /* row of output data */
      float             zero_line[512], slope, reference_aberration;
      int               row, col, array_size =512;
      long int          position_offset, value_offset;

scroll(10);
      printf("Please wait while I calculate the %c transverse ray aberrations.
.\n",direction);

reference_aberration = calc_reference_aberration(direction);
      for(col=0; col<512; col++)
        {
          zero_line[col] = 0;/*set up a reference line */
          transverse_aberrations[col] = 0;
        }
      if(direction == 'x')
        {
          for(row=top; row<= bottom; row++) /*fill the top with 0's */
          {
            printf("Doing row # %3d \n",row);

position_offset = pointer_offset(row,0,2,512);/* find offset in two
byte file */
            value_offset    = pointer_offset(row,0,1,512);/* find offset in one
byte file */
            fseek(lo_position,position_offset,SEEK_SET);
            fseek(hi_position,position_offset,SEEK_SET);
            fseek(lo_value,value_offset,SEEK_SET);
            fseek(hi_value,value_offset,SEEK_SET);

fread(lo_positions,sizeof(lo_positions),1,lo_position);
            fread(hi_positions,sizeof(hi_positions),1,hi_position);
            fread(lo_values,sizeof(lo_values),1,lo_value);
            fread(hi_values,sizeof(hi_values),1,hi_value);
                /* read a line of data in from each file */
```

```c
            fb_rhline(B2,0,row,512,mid_point_row); /* read in the row of mid points */ for(col=left; col<=right; col++) /*in the active area */
            {   if((abs(status_array[row][col])!=3) && (status_array[row][col] != 0))
                {
                    if(hi_values[col] != lo_values[col])
                    { slope = ((float)hi_positions[col] - (float)lo_positions[col])/((float)hi_values[col]-(float)lo_values[col]);
                        transverse_aberrations[col] = slope*((float)mid_point_row[col]-(float)lo_values[col])+(float)lo_positions[col];
                        /* this gives the transverse ray aberration in steps*/
                        transverse_aberrations[col] = microinches_per_step*transverse_aberrations[col];
                        transverse_aberrations[col] = transverse_aberrations[col]-reference_aberration;
                        if(status_array[row][col] == 2)
                        {
                            Ex_half_1 = Ex_half_1+transverse_aberrations[col];
                            Pixels_in_one++;  /* increment pixel count */
                        }
                        if(status_array[row][col] == -2)
                        {   Ex_half_2 =Ex_half_2 +transverse_aberrations[col];
                            Pixels_in_two++; /* increment pixel count */
                        }
                    }
                    else
                    {
                        printf("Error at col # %3d. Hi_value= %3d  lo_value= %3d \n",col,hi_values[col],lo_values[col]);
                        transverse_aberrations[col] = transverse_aberrations[col-1];
                    }
                }
            } write_data_to_file(transverse_aberrations, direction, row);
            /*save this row */ memcpy(transverse_aberrations,zero_line,sizeof(transverse_aberrations));
            /*re-zero out the line of transverse_aberrations */

}/*end of row loop */
        Ex_half_1 = Ex_half_1 /Pixels_in_one;
        Ex_half_2 = Ex_half_2 /Pixels_in_two; /* calc average */
    }
    else
    {

Pixels_in_one = 0; /* reinitialize */
        Pixels_in_two = 0;

for(col=left; col<right; col++) /*fill the top with 0's */
        {
            printf("Doing col # %3d \n",col);

position_offset = pointer_offset(col,0,2,512);/* find offset in two byte file */
            value_offset    = pointer_offset(col,0,1,512);/* find offset in one byte file */
            fseek(lo_position,position_offset,SEEK_SET);
            fseek(hi_position,position_offset,SEEK_SET);
            fseek(lo_value,value_offset,SEEK_SET);
            fseek(hi_value,value_offset,SEEK_SET);

fread(lo_positions,sizeof(lo_positions),1,lo_position);
            fread(hi_positions,sizeof(hi_positions),1,hi_position);
            fread(lo_values,sizeof(lo_values),1,lo_value);
            fread(hi_values,sizeof(hi_values),1,hi_value);
            /* read a line of data in from each file */ fb_rvline(B2,col,0,512,mid_point_row); /* read in the row of mid points */
```

```
          for(row=top; row<=bottom; row++) /*in the active area */
          {  if((abs(status_array[row][col])!=3) && (status_array[row][col] !=
0))
            {
              if(hi_values[row] != lo_values[row])
              {
                slope = ((float)hi_positions[row] - (float)lo_positions[row])
/((float)hi_values[row]-(float)lo_values[row]);
                transverse_aberrations[row] = slope*((float)mid_point_row[row
]-(float)lo_values[row])+(float)lo_positions[row];
                /* this gives the transverse ray aberration in steps*/
                transverse_aberrations[row] = microinches_per_step*transverse
_aberrations[row];
                transverse_aberrations[row] = transverse_aberrations[row]-ref
erence_aberration;
                if(status_array[row][col] == 1)
                {
                  Ey_half_1 =Ey_half_1+transverse_aberrations[row];
                  Pixels_in_one++;
                }
                if(status_array[row][col] == -1)
                {
                  Ey_half_2 = Ey_half_2+transverse_aberrations[row];
                  Pixels_in_two++;
                }
              }
              else
              {
                printf("Error at row # %3d. Hi_value= %3d  lo_value= %3d \n",
row,hi_values[row],lo_values[row]);
                transverse_aberrations[row] = transverse_aberrations[row-1];
              }
            }
          } write_data_to_file(transverse_aberrations, direction, col);
          /*save this row */ memcpy(transverse_aberrations,zero_line,sizeof(transverse_aberration
s));
          /*re-zero out the line of transverse_aberrations */
        }/*end of  for activ area */

Ey_half_1 = Ey_half_1/Pixels_in_one;/*calc averages */
        Ey_half_2 =Ey_half_2/Pixels_in_two;

}/*end of y direction loop */
    }/*end of function */
/*                                                                         */
/*                                                                         */
/***************************************************************************/
```

*STEP 4*

```
/***************************************************************************/
/*                                                                         */
/*   function  find_transverse_ray_aberrations() .. to do the calcs        */
/*             from the four data files from the test to calc Ex, Ey      */ void  find_transverse_ray_aberrations(char  direction)
/*
      direction  -> which cut this is  */

{
      FILE              *output_file; /*pointer to output data file */
      unsigned char     mid_point_row[512], hi_values[512], lo_values[512];
      short             hi_positions[512], lo_positions[512];
      float             transverse_aberrations[512]; /* row of output data */
      float             zero_line[512], slope, reference_aberration;
```

```c
        int             row, col, array_size =512;
        long int        position_offset, value_offset;

scroll(10);
    printf("Please wait while I calculate the %c transverse ray aberrations.
.\n",direction);

reference_aberration = calc_reference_aberration(direction);
    for(col=0; col<512; col++)
       {
         zero_line[col] = 0;/*set up a reference line */
         transverse_aberrations[col] = 0;
       }
    if(direction == 'x')
       {
         for(row=top; row<= bottom; row++) /*fill the top with 0's */
           {
             printf("Doing row # %3d \n",row);

position_offset = pointer_offset(row,0,2,512);/* find offset in two
byte file */
    value_offset    = pointer_offset(row,0,1,512);/* find offset in one
byte file */
             fseek(lo_position,position_offset,SEEK_SET);
             fseek(hi_position,position_offset,SEEK_SET);
             fseek(lo_value,value_offset,SEEK_SET);
             fseek(hi_value,value_offset,SEEK_SET);

fread(lo_positions,sizeof(lo_positions),1,lo_position);
             fread(hi_positions,sizeof(hi_positions),1,hi_position);
             fread(lo_values,sizeof(lo_values),1,lo_value);
             fread(hi_values,sizeof(hi_values),1,hi_value);
              /* read a line of data in from each file */ fb_rhline(B2,0,row,512,mid_point_row); /* read in the row of mid poi
nts */ for(col=left; col<=right; col++) /*in the active area */
               { if((abs(status_array[row][col])!=3) && (status_array[row][col]
!= 0))
                 {
                 if(hi_values[col] != lo_values[col])
                   { slope = ((float)hi_positions[col] - (float)lo_positions[col])/
((float)hi_values[col]-(float)lo_values[col]);
                     transverse_aberrations[col] = slope*((float)mid_point_row[col]
-(float)lo_values[col])+(float)lo_positions[col];
                     /* this gives the transverse ray aberration in steps*/
                     transverse_aberrations[col] = microinches_per_step*transverse_
aberrations[col];
                     transverse_aberrations[col] = transverse_aberrations[col]-refe
rence_aberration;
                     if(status_array[row][col] == 2)
                       {
                         Ex_half_1 = Ex_half_1+transverse_aberrations[col];
                         Pixels_in_one++;  /* increment pixel count */
                       }
                     if(status_array[row][col] == -2)
                       {  Ex_half_2 =Ex_half_2 +transverse_aberrations[col];
                         Pixels_in_two++; /* increment pixel count */
                       }
                   }
                 else
                   {
                     printf("Error at col # %3d. Hi_value= %3d  lo_value= %3d \n",c
ol,hi_values[col],lo_values[col]);
                     transverse_aberrations[col] = transverse_aberrations[col-1];
                   }
                 }
               }
```

```
            write_data_to_file(transverse_aberrations, direction, row);
            /*save this row */ memcpy(transverse_aberrations,zero_line,sizeof(transverse_aberration
s));
            /*re-zero out the line of transverse_aberrations */

}/*end of row loop */
          Ex_half_1 = Ex_half_1 /Pixels_in_one;
          Ex_half_2 = Ex_half_2 /Pixels_in_two; /* calc average */
        }
        else
        {
          Pixels_in_one = 0; /* reinitialize */
          Pixels_in_two = 0;

for(col=left; col<right; col++) /*fill the top with 0's */
          {
            printf("Doing col # %3d \n",col);

position_offset = pointer_offset(col,0,2,512);/* find offset in two
byte file */
            value_offset    = pointer_offset(col,0,1,512);/* find offset in one
byte file */
            fseek(lo_position,position_offset,SEEK_SET);
            fseek(hi_position,position_offset,SEEK_SET);
            fseek(lo_value,value_offset,SEEK_SET);
            fseek(hi_value,value_offset,SEEK_SET);

fread(lo_positions,sizeof(lo_positions),1,lo_position);
            fread(hi_positions,sizeof(hi_positions),1,hi_position);
            fread(lo_values,sizeof(lo_values),1,lo_value);
            fread(hi_values,sizeof(hi_values),1,hi_value);
            /* read a line of data in from each file */ fb_rvline(B2,col,0,512,mid_point_row); /* read in the row of mid poi
nts */ for(row=top; row<=bottom; row++) /*in the active area */
            { if((abs(status_array[row][col])!=3) && (status_array[row][col] !=
0))
              {
                if(hi_values[row] != lo_values[row])
                { slope = ((float)hi_positions[row] - (float)lo_positions[row])
/((float)hi_values[row]-(float)lo_values[row]);
                    transverse_aberrations[row] = slope*((float)mid_point_row[row
]-(float)lo_values[row])+(float)lo_positions[row];
                    /* this gives the transverse ray aberration in steps*/
                    transverse_aberrations[row] = microinches_per_step*transverse
_aberrations[row];
                    transverse_aberrations[row] = transverse_aberrations[row]-ref
erence_aberration;
                    if(status_array[row][col] == 1)
                    {
                      Ey_half_1 =Ey_half_1+transverse_aberrations[row];
                      Pixels_in_one++;
                    }
                    if(status_array[row][col] == -1)
                    {
                      Ey_half_2 = Ey_half_2+transverse_aberrations[row];
                      Pixels_in_two++;
                    }
                }
                else
                {
            printf("Error at row # %3d. Hi_value= %3d  lo_value= %3d \n",
row,hi_values[row],lo_values[row]);
                    transverse_aberrations[row] = transverse_aberrations[row-1];
                }
              }
            }
```

```
            write_data_to_file(transverse_aberrations, direction, col);
            /*save this row */ memcpy(transverse_aberrations,zero_line,sizeof(transverse_aberration
s));
            /*re-zero out the line of transverse_aberrations */
         }/*end of  for activ area */

Ey_half_1 = Ey_half_1/Pixels_in_one;/*calc averages */
         Ey_half_2 =Ey_half_2/Pixels_in_two;

}/*end of y direction loop */
   }/*end of function */

/*                                                                           */
/*                                                                           */
/*****************************************************************************/
```

*STEP 5*

```
/*****************************************************************************/
/*                                                                           */
/*         function   calculate_OPD_map  .... to oversee the process         */
/*                                         of calculating the OPD map        */
/*                                                                           */ void   calculate_OPD_map(short top, short bottom, short left, short right)

/* inputs are the four limits in camera array space of the working area
      all are in the range 0 to 511 */

{
      short   row, col;   /* counting variables for the pixel location */
      char    direction;  /* which direction you are integrating
                                  'h' -> horizontal
                                  'v' -> vertical    */
      int     step_size;  /* you don't have to go in 1 pixel increments */
      int     i,count;

long int   W_offset,E_offset;
      float   *temp_ptr;/* temporary pointer for switching pointers */
      float   radius;

printf("Hit a key to do the OPD mapping.");
      getch();
      /* clear the screen. */
      scroll(30);
      flushall(); /* make sure there are no junk left in keybd buffers */
      printf("\n What would you like for your step size in # of pixels?");
      scanf("%d",&binning);
      printf("\n What is the radius of curvature of the mirror ? ");
      scanf("%f",&radius_of_curvature);
      radius_of_curvature = radius_of_curvature*1000000;/*covert to uin */ printf("\n What is the mirror radius ?");
      scanf("%f",&radius);
      radius = radius*1000000;   /* convert to uin */ spacing = 2.0*radius/(right-left);

direction = 'h';   /* do the horizontal direction first. */
      mid_col =(right+left)/2; /* calc the column number for the middle of the
                                  image space */
      step_size = binning;

W_offset = pointer_offset(top-step_size,0,sizeof(element_size),array_size);
      E_offset = pointer_offset(top,0,sizeof(element_size),array_size);
      /* calc location of pointers in the two files */
```

```
    fseek(Wx_ptr,W_offset,SEEK_SET); /* move the OPD pointer */
    fseek(Ex_ptr,E_offset,SEEK_SET); /* move the aberration pointer */
    fread(previous_line,sizeof(previous_line),1,Wx_ptr); /* read in a line of o
pds */

E_offset = pointer_offset(mid_col,0,sizeof(element_size),array_size);
  fseek(Ey_ptr,E_offset,SEEK_SET);
  fread(center_line,sizeof(center_line),1,Ey_ptr);
  /* find location of data for center col and read it in for future use */ for(row=top; row<=bottom; row=row+binning)
  /* go from top to bottom */
  {
    if((row%50) ==0)
      printf("Doing row %d\n",row);
    col = mid_col; /* start at center */ fread(current_E_line,sizeof(current_E_line),1,Ex_ptr);

/* read in line of aberrations to be use now */
    /*fread(current_W_line,sizeof(current_W_line),1,Wx_ptr);*/
    /* read in line of OPD's to be calculated for this row */
    step_size = binning;

if((abs(status_array[row][col]) == 1) && (abs(status_array[row-binning][c
ol]) ==3))
        {
          walk_around_obstruction(&row,&col,step_size,direction);
        }
        else
        {
          if(abs(status_array[row][col]) == 1)
            current_W_line[col] = calc_OPD_value(center_line[row], center_line[r
ow-step_size],
                                                previous_line[col],-step_size);
          else
            if(abs(status_array[row][col]) == 3)
            {
              walk_around_obstruction(&row,&col,step_size,direction);
            }
        }

/* calc OPD at this point using Ey in center col */
    mark_point(row,col);
    /*col = mid_col; */ do_next_point(row,col+step_size,step_size,direction);
    /* do row to right of center */ col = mid_col;
    step_size = -binning; /* step size is negative going left */ if((abs(status_array[row][col]) == 1) && (abs(status_array[row-binning][c
ol]) ==3))
        {
          walk_around_obstruction(&row,&col,step_size,direction);
        }
        else
        {
          if(abs(status_array[row][col]) == 3)
            walk_around_obstruction(&row,&col,step_size,direction);
        }
    /* if the point and the one before it was a good point dont recalc opd */ do_next_point(row,col+step_size,step_size,direction);
    /* do row to left of center */

W_offset = pointer_offset(row,0,sizeof(element_size),array_size);
    fseek(Wx_ptr,W_offset,SEEK_SET);
    fwrite(current_W_line,sizeof(current_W_line),1,Wx_ptr);

/* find location in which to put data and do it */
```

```c
memcpy(previous_line,current_W_line,2048);
memcpy(current_W_line,zero_line,2048);
/* copy current line into previous line */
}
/*printf("Hit a key to do other direction. \n");
getch(); */ show_area();
printf("Now I will do it in the vertical direction\n");
direction = 'v'; /* do the vertical direction */
mid_row = (top+bottom)/2; /* find value for the vertical middle of the
                             image space */ step_size = binning;
W_offset = pointer_offset(left-step_size,0,sizeof(element_size),array_size)

E_offset = pointer_offset(left,0,sizeof(element_size),array_size);

fseek(Wy_ptr,W_offset,SEEK_SET);
fseek(Ey_ptr,E_offset,SEEK_SET);
fread(previous_line,sizeof(previous_line),1,Wy_ptr);
/* calc pointers in files and read in first reference row*/

E_offset = pointer_offset(mid_row,0,sizeof(element_size),array_size);
fseek(Ex_ptr,E_offset,SEEK_SET); /*move pointer to current data */
fread(center_line,sizeof(center_line),1,Ex_ptr); /* read in center row */

/* no to do the actual calculations */ for(col=left; col<=right; col=col+binning)
/* go from left toright */
{
  if((col % 50) == 0)
    printf("Doing col %d\n",col);
  row = mid_row;
  fread(current_E_line,sizeof(current_E_line),1,Ey_ptr);
  /*fread(current_W_line,sizeof(current_W_line),1,Wy_ptr);*/
  /* read in columns for current data */
  step_size = binning;

if((abs(status_array[row][col] )== 1) && (abs(status_array[row][col-binni
ng]) ==3))
        {
           walk_around_obstruction(&row,&col,step_size,direction);
        }
      else
        {
          if(abs(status_array[row][col]) == 1)
             current_W_line[row] = calc_OPD_value(center_line[col],center_line[c
ol-step_size],
                                           previous_line[row],step_size);
          else
            if(abs(status_array[row][col]) == 3)
              walk_around_obstruction(&row,&col,step_size,direction);
        }
     mark_point(row,col);

step_size = binning; /*step size is positive going down */
    do_next_point(row+step_size,col,step_size,direction);
    /* do part of row below center */ step_size = -binning;
    row= mid_row; /* reset to middle row to do other side */ if((abs(status_array[row][col] )== 1) && (abs(status_array[row][col-binni
ng]) ==3))
        {
           walk_around_obstruction(&row,&col,step_size,direction);
        }
      else
        {
          if(abs(status_array[row][col]) == 3)
             walk_around_obstruction(&row,&col,step_size,direction);
        }
```

```
        do_next_point(row+step_size,col,step_size,direction);
        /* do part of row above the center */

W_offset = pointer_offset(col,0,sizeof(element_size),array_size);
        fseek(Wy_ptr,W_offset,SEEK_SET);
        fwrite(current_W_line,sizeof(current_W_line),1,Wy_ptr);

memcpy(previous_line,current_W_line,2048);
        memcpy(current_W_line,zero_line,2048);
    }
}/* end of calc_OPD_map */
/*                                                                          */
/*                                                                          */
/****************************************************************************/
/*                                                                          */
/*          function  do_next_point() ... to go to next point and do        */
/*                                  the calculation                         */ void  do_next_point(short row, short col, int step_size, char direction)
    /* recursively goes down the row point by point doing the calculation
        as it goes. */

{
       if(status_array[row][col] !=0)   /* if it is not a unused point */
       {
          if(direction == 'h')
          {
             if(abs(status_array[row][col]) == 3)  /* if its an obstructed point */
             {
                walk_around_obstruction(&row,&col,step_size,direction);
                col = col + step_size;
             }
             current_W_line[col] = calc_OPD_value(current_E_line[col],current_E_line
[col-step_size],
                                                current_W_line[col-step_size],step
_size);

mark_point(row,col); /* mark the finished point on the screen */
             do_next_point(row,col+step_size,step_size,direction);
          } /* end of horizontal case */
          else
          {
             if(abs(status_array[row][col]) == 3)
             {
                walk_around_obstruction(&row,&col,step_size,direction);
                row = row + step_size; /*move to next point to be done */
             }
             current_W_line[row] = calc_OPD_value(current_E_line[row],current_E_line
[row-step_size],
                                                current_W_line[row-step_size],-ste
p_size);

mark_point(row,col); /* show point on screen */
             do_next_point(row+step_size,col,step_size,direction);
          }/* end of vertical case */
       } /* end of if status != 0 case .. if it does you do nothing because it is
the end of
            the row or column */
    }/* end of function */
/****************************************************************************/
                                                                          5
/****************************************************************************/
/*                                                                          */
/*          function  walk_around_obstruction() .. to use previous data     */
/*                                  to go around any obstructions           */ void  walk_around_obstruction(short *row, short *col, int step_size,
                                  char  direction)
    /* this function will find the edge of obstruction and go around it */

{
       short  new_row, new_col, current_row, current_col;
       current_row = *row;
       current_col = *col;
```

```c
   if(direction == 'h')
   {
      new_row = *row - binning; /* drop to the previous row which has already
                                   been calculated */
      new_col = current_col;
      while((abs(status_array[new_row][new_col]) == 3) || (abs(status_array[current_row][new_col]) ==3))
      {
         /*printf("At row %3d col %3d \n",current_row,new_col);*/
         mark_point(current_row,new_col);
         /* if(debug == 'y')
             getch(); */
         new_col = new_col+step_size; /* keep going as long as in obstruction*/
      } if(status_array[new_row][new_col] !=0)
      /* if un obstructed point is a valid point go on */
      {
         current_W_line[new_col] =calc_perpendicular(new_row,new_col,step_size,direction);
         integrate_backwards(*row,new_col,step_size,direction);

/* go back to original row and identify points between it and obstruction*/
      }
      *col = new_col;
   } /* done for horizontal case */ else

{
      new_col = *col - binning; /*drop to previous col*/
      new_row = current_row;
      while((abs(status_array[new_row][new_col]) == 3) || (abs(status_array[new_row][current_col]) ==3))
      /*step through the obstruction */
      {
         mark_point(new_row,current_col);
         new_row = new_row + step_size;

}/* at this point you are out of obstruction */ if(status_array[new_row][new_col] != 0)
      {
         current_W_line[new_row] =calc_perpendicular(new_row,new_col,step_size,direction);
         integrate_backwards(new_row,*col,step_size,direction);
      }
      *row = new_row;
   }/* end of vertical case */
}/* end of function walk_around_obstruction */
/*                                                                           */
/*                                                                           */
/*****************************************************************************/
/*                                                                           */
/*               function  integrate_backwards()                             */
/*               ... to go long row or col backwards to obstruction          */ void  integrate_backwards(short row, short col, int step_size,
                          char direction)

{
   if(direction == 'h')
      while((abs(status_array[row][col-step_size]) != 3)&&(col != mid_col-step_size))
      {
         mark_point(row,col);
         col = col-step_size;
         current_W_line[col] = calc_OPD_value(current_E_line[col],
                                              current_E_line[col+step_size],
                                              current_W_line[col+step_size],-step_size);
      }
   else
```

```
        while((abs(status_array[row-step_size][col]) != 3)  && (row != mid_row-st
ep_size))
              {
                    mark_point(row,col);
                    row = row-step_size;
                    current_W_line[row] = calc_OPD_value(current_E_line[row],
                                                        current_E_line[row+step_size],
                                                        current_W_line[row+step_size],ste
p_size);
              }
      }/* end function integrate_backwards */
/*                                                                              */
/*                                                                              */
/******************************************************************************/
```

It is claimed:

1. A method suitable for determining a wavefront aberration over an entire surface of an optical sample, the optical sample being tested in a Foucault knife-edge test assembly, the assembly comprising:
   (a) an optical sample to be tested, the optical sample defining a sample space;
   (b) a source of radiation directed along a reference axis to the optical sample;
   (c) a detection means aligned on the source reference axis, for detecting the radiation imaged by the optical sample, the detection means defining a conjugate sample space, with respect to the optical sample space; and
   (d) a knife-edge capable of being positioned in a series of knife-edge position steps, for cutting the radiation imaged by the optical sample, thereby producing a variable radiation pattern in the conjugate sample space; the method comprising the steps of:
   (1) determining, for each of a plurality of predetermined areas in the conjugate sample space, a radiation reference intensity parameter, based on the knife-edge positioned in a fully occluded, and fully non-occluded position;
   (2) positioning the knife-edge through a sequence of discrete positioning steps for generating a family of variable radiation intensity patterns in the conjugate sample space, wherein each member of the variable radiation patterns is a function of knife-edge position, and a function of each predetermined area in the conjugate sample space;
   (3) computing for each member of the family of variable radiation patterns, an interpolated knife-edge position in two orthogonal directions;
   (4) generating a slope magnitude function for each of the two orthogonal directions, for each of the plurality of predetermined areas in the conjugate sample space; and
   (5) integrating the slope magnitude functions over each of the two orthogonal directions, over each of the plurality of predetermined areas in the conjugate sample space.

2. A method according to claim 1, comprising the step of generating a pair of slope magnitude functions $(\theta_x, \theta_y)$, where $\theta_x, \theta_y$ are expressed by the equations:

$$\theta_x = - \frac{\partial \Delta\omega(x, y)}{n \partial y}$$

$$\theta_y = - \frac{\partial \Delta\omega(x, y)}{n \partial y},$$

where n = the index of refraction of the optical sample being tested; and where the function $\Delta\omega(x,y)$ is defined as an optical path difference induced by the optical sample.

3. A method according to claim 2, comprising the step of integrating a pair of slope magnitude functions $\theta_x, \theta_y$ over integration paths circumscribed by an image of a pupil of the optical sample.

* * * * *

UNITED STATES PATENT AND TRADEMARK OFFICE
CERTIFICATE OF CORRECTION

PATENT NO. : 4,979,819
DATED : December 25, 1990
INVENTOR(S) : William D. Humbel et al.

It is certified that error appears in the above-identified patent and that said Letters Patent is hereby corrected as shown below:

Col. 5, line 22    after "matrix" insert --cells in--;

Col. 6, line 20    after "parameter" delete "$I_R$)" and substitute therefor --$(I_R)-$--;

Col. 6, line 31    after "parameter" delete "$I_R$)" and substitute therefor --$(I_R)-$--.

Signed and Sealed this

Nineteenth Day of May, 1992

Attest:

DOUGLAS B. COMER

Attesting Officer    Acting Commissioner of Patents and Trademarks